United States Patent [19]

Soderberg

[11] Patent Number: 5,212,208
[45] Date of Patent: May 18, 1993

[54] PROCESS OF INSULATING A BODY CAVITY

[75] Inventor: Jan R. Soderberg, Overijse, Belgium

[73] Assignee: Exxon Chemical Patents Inc., Linden, N.J.

[21] Appl. No.: 931,081

[22] Filed: Aug. 17, 1992

Related U.S. Application Data

[62] Division of Ser. No. 478,798, Feb. 12, 1990, Pat. No. 5,160,465.

[30] Foreign Application Priority Data

Feb. 13, 1989 [GB] United Kingdom ............... 8903211

[51] Int. Cl.$^5$ ............................................. C08J 9/10
[52] U.S. Cl. ................................. 521/96; 521/89; 521/94; 521/149
[58] Field of Search ............ 521/149, 96, 89, 94

[56] References Cited

U.S. PATENT DOCUMENTS

| | | | |
|---|---|---|---|
| 4,246,357 | 1/1981 | Hobes et al. | 521/149 |
| 4,247,652 | 1/1981 | Matsuda et al. | 521/95 |
| 4,314,035 | 2/1982 | Hobes et al. | 521/149 |
| 4,370,423 | 1/1983 | Sikora | 521/84 |
| 4,394,459 | 7/1983 | Sikora | 521/84 |
| 4,413,066 | 11/1983 | Isaka et al. | 521/149 |
| 4,480,054 | 10/1984 | Enderle | 521/84.1 |
| 4,499,210 | 2/1985 | Senuma et al. | 521/91 |
| 4,898,630 | 2/1990 | Kitoh et al. | 156/79 |
| 4,901,676 | 2/1990 | Nelson | 122/19 |

FOREIGN PATENT DOCUMENTS

| | | |
|---|---|---|
| 57-60136 | 6/1980 | Japan. |
| 1053029 | 8/1984 | Japan. |
| 1053030 | 8/1984 | Japan. |
| 60-90737 | 5/1985 | Japan. |
| 1044757 | 10/1966 | United Kingdom. |
| 1211451 | 11/1970 | United Kingdom. |
| 1227454 | 4/1971 | United Kingdom. |
| 1447825 | 9/1976 | United Kingdom. |

Primary Examiner—Morton Foelak
Attorney, Agent, or Firm—T. Dean Simmons; R. W. Mulcahy

[57] ABSTRACT

A foamable composition for in situ expansion for example in a car pillar includes a base polymer derived of ethylene and an olefinically unsaturated acrylic ester with an MI of from 0.1 to 6 and containing from 10 to 40% of ester derived units. The composition is foamed and cross-linked to adhere to the car pillar interior and provide closed cell foam acting as a moisture-sound barrier.

9 Claims, 1 Drawing Sheet

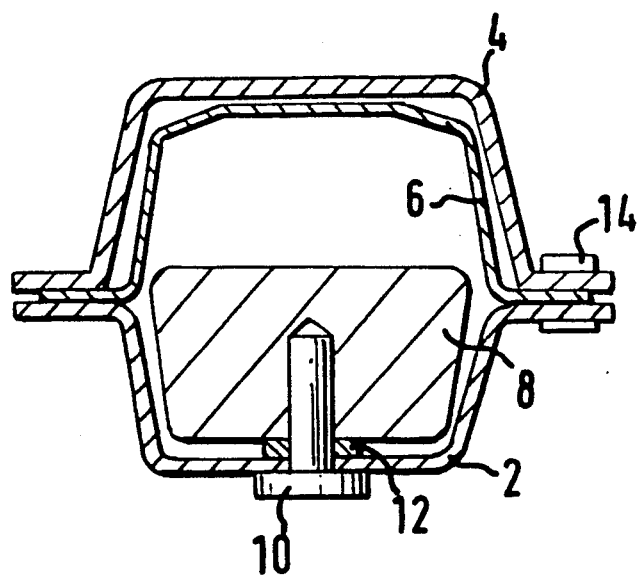

PROCESS OF INSULATING A BODY CAVITY

This is a division of application Ser. No. 478,798, filed Feb. 12, 1990, U.S. Pat. No. 5,160,465.

FIELD OF INVENTION

The invention relates to shaped foamable parts, compositions therefor and to processes for expanding such parts. The invention relates particularly to carbody inserts made for use, for example, into elongated hollow cavities, such as exist in the interior of car pillars to be foamed in situ to adhere to the surrounding metal so as to provide a sound and/or moisture barrier.

BACKGROUND TO INVENTION

It is known to drop balls made of foamable polyurethane material into the cavities inside car pillars so that these form a barrier. However, the material does not adhere to the steel nor do they necessarily and reproducibly block the cavity to be filled.

It is also known to use the technique of direct injection of a two-component polyurethane system with volatile fluoro-chlorohydrocarbons (freon) but this involve a separate operation in the production process.

It is also known from JP 55046940 to expand a sheet or tube of a thermoplastic resin and a foaming agent such as azodicarbonamide in situ between an inner and outer pipe to provide heat insulation. JP 60090737 also discloses an innerliner obtained by inserting a resin cylinder capable of being foamed by heating and externally heating a tubular construction to expand the tubular resin. The inner pipe is withdrawn. The tubular resin may contain a variety of possible olefinic copolymers but copolymers of ethylene methyl acrylate are not disclosed. The material to be foamed is present in cylinder with a high surface to volume ratio. Heat is transmitted to the material from an external heat source through heat-conductive metal. The foaming period is likely to be short, the foaming controllable and commencing from the outside or surface of the material.

L+L Products Inc of Michigan USA supply adhesive sealants of heat activatable, curable and expandable materials for moisture and sound insulation in automative applications. No detailed information is available as to the polymer and the manner of application but sealants may be in extruded form.

U.S. Pat. No. 4,480,054 discloses a foamable curable composition of a carboxylic acid co- or terpolymer with a terpolymer containing possibly methylacrylate as a termonomer. Such materials may have a low softening points so that foams are unstable if exposed to elevated temperatures for a prolonged period. The carboxylic acide groups may retard curing, aggravating form instability at high temperatures.

U.S. Pat. No. 4499210 discloses a foamable composition of amongst others ethylene alkylacrylate polymers but the foam is open cell and does hence not possess suitable barrier properties.

GB-1227454 discloses foamable mixtures of copolymers of ethylene with esters of ethylenically unsaturated acids but using physical blowing agents such as propane etc. Expansion characteristics cannot be finely controlled.

GB-1211451 and GB-1447825 disclose foamable mixtures of ethylene copolymers in which pressure is used to control action of an expanding agent which would not permit in situ controlled expansion. GB-1044757 discloses a foamable, curable composition including (Example 2 a copolymer of ethylene and ethylacrylate) using special peroxides to permit completion of cross-linking or curing until after foaming has taken place in a closed mould at 170° C. The part is moulded and emerges from the mould in a foamed condition. In situ expansion under a wide possible range of curing temperatures would be difficult.

It is the object of the invention to provide a foamable shaped part which can be mounted early in a car assembly operation, free of surrounding metal walls, permits those walls to be treated and then expands in situ to contact the walls and adhere thereto to form a closed-cell foam plug.

It is another object to provide a composition for shaping into a foamable part which has characteristics suitable for processing as shown above i.e. which (1) permits polymer and foaming/curing package to be blended and shaped without foaming or curing;

(2) which expands, using surrounding air and internally supplied heat from a relatively low surface area to volume ratio;

(3) which delays curing until after appreciable expansion has taken place so as to provide good adhesion at the surface;

(4) which then cures and remains in position without foam collapse during exposure at elevated temperatures without risk of metal corrosion.

SUMMARY OF INVENTION

According to the invention there is provided a shaped, foamable part comprising a composition of at least 65 wt % of a base polymer containing units derived of ethylene and an olefinically unsaturated methylacrylate, having an MI of from 0.1 to 6 and containing from 10–40 percent by weight of methyl acrylate and a cross-linking agent, a chemical blowing agent and a blowing agent activator so that the part is foamable and curable concurrently at a temperature between 110° to 190° C. and gives a closed-cell foam. Preferably no other polymer is present and the EMA may then by present in an amount of from 85 to 95 wt % for example.

Minor amounts of compatible melting point increasing polymers may however be added if appropriate.

The selection of methyl acrylate seems particularly advantageous for the intended end-use, where heat stability without foaming and curing during blending and shaping must be combined with an expansion in adhesive condition at elevated curing temperature, maintained for a prolonged period. Using EMA as opposed to known EVA in a blend with a foaming/curing package as described provides an increasing melt strength due to curing simultaneously with and/or subsequent to foaming whilst surface adhesion is preserved for adhering the part to the metal surface. The foam is thermally stable and stable in form, does not cause corrosion, or undesirable odor, gives good adhesion to anti-corrosive coatings whilst brittleness is avoided even after prolonged heat treatment. Using EMA alone, as a polymer component, facilitates homogeneous blending and foaming. The part in its unfoamed state does not contaminate solutions used for anti-corrosion treatment. No specialized equipment is necessary in vehicle production. The EMA may provide a higher melt strength at elevated temperatures so aiding form stability.

The invention also provides a process for use of the parts which has the steps of assembling the part in the open space of a vehicle body so that the part is for at least part of its surface in close proximity but substantially spaced from surrounding internal metal surface;

submitting the vehicle to low temperature anti-corrosion treatment whilst the insert remains unexpanded; and submitting the vehicle body to high temperature curing treatments in conditions under atmospheric pressure such that the insert expands, contacts and adheres to the surrounding metal surface and forms a sound and moisture insulating plug of closed-cell foam.

The part expands with suitable cross-linking/foaming additives into closed cell foam.

The foam is non-moisture-absorbing and so corrosion of vehicle parts can be minimised. The part or insert forms a plug which provides effective noise and sound insulation when introduced into carpillar cavity. At the same time, the softening, cross-linking and foam generating characteristics are such that the product can be stored at ambient temperatures but will expand initially upon heating so as to contact adjacent metal surfaces for improved heat transfer. The cross-linking and foam generation can be maintained for a prolonged time so that a car vehicle can dwell for a considerable time in an oven without disadvantageous shrinking of the foamed composition inserted into a carpillar, for example.

The part may be fastened by a central screw or stud, preferably of metal to support the part with a minimum of support. The stud or screw will act as a heat conductor to the interior of the part, which may initially hence be heated more rapidly from the inside than by the air on the outside. The lower curing rate of EMA may assist and ensure that the part can be expanded gradually until surrounding metal is contacted without overcuring the metal contacting surface and reducing adhesion.

The foaming and crosslinking activity proceeds in a manner suitable for providing a stable adhesive foam under conditions in which the temperature and duration of cure cannot be controlled through an outside, large surface area heat conductor.

In order to achieve the best processing characteristics the base polymer should preferably have a softening point in the region of 90° C., in the absence crosslinking. With a crosslinking agent, creep and flow resistance at higher temperatures is improved. Broad molecular weight polymer distributions are preferred to ensure melt strength. Preferably one uses as crosslinking agents 4,4-di, tert butyl peroxy n-butyl valerate; 1,1 di-tert, butyl peroxy 3,3,5 trimethylcyclohexane; and/or bis (tert butyl peroxy isopropyl) benzene.

The blowing agent may be benzene sulfonyl hydrazide or azodicarbonamide in conjunction with a blowing agent activator such as di-ethylene glycol. The di-ethylene glycol may help to improve adhesion. Typical quantities of the various additives are from 0.05 to 5% of the crosslinking agent preferably from 1.5 to 3% by weight. The chemical blowing agent is preferably present in an amount of 3 to 10% by weight and the di-ethylene glycol is present in an amount of 1 to 4% by weight.

Advantageously a low temperature blowing agent such as p-toluene sulfonyl hydrazide is used for commencing foaming at low temperature whilst higher temperature foaming agents provide a sustained foaming effect during any subsequent heat treatment.

BRIEF DESCRIPTION OF THE DRAWING

The FIGURE shows a foamable insert supported in a spaced relationship from walls defining an interior cavity of pillar.

Preferred features of the composition and of the process will become apparent from a description of an example of the invention.

EXAMPLE 1

A composition was prepared by dry-blending and extruding or by continuously adding peroxy or blowing agent to an extruder. The extrusion is performed twice, once to achieve low shear mixing using a small die orifice; then a second extrusion follows to bring the composition to the required extrusion shape. The cross-section of the extruded material may vary depending on the cross-sectional shape of the car cavity to be plugged.

The composition consists of:

| Copolymer of ethylene and methyl acrylate MI 0.7, MA 15% by weight | 63.55 |
| --- | --- |
| LDPE (melting point 1.5° C. density 0.919) | 27.15 |
| 4,4-di, tert butyl peroxy n-butyl valerate (Trigonox 29/40) | 0.63 |
| bis (tert butyl peroxy isopropyl) benzene (Perkadox 14/40) | 1.63 |
| benzene sulphonyl hydrazide (Cellogen OT) | 3.62 |
| Azodicarbonamide (Porofor ADC-K) | 1.81 |
| di-ethylene glycol (DEG) | 1.81 |

(all percentages are by weight)

The Porofor component contains zinc which activates the blowing activity.

EXAMPLE 2

A formulation was blended as in Example 1. Unless specified otherwise the ingredients are the same as in Example 1.

| Methylacrylate | 89.7 |
| --- | --- |
| Cellogen OT | 3.6 |
| Porofor ADC-K | 1.8 |
| Perkadox 14/40 | 1.6 |
| Trigonox 29/40 | 0.6 |
| DEG | 1.8 |
| Genitron PTS | 0.9 |

All percentages are by weight. Genitron PTS is a p-toluene sulfonyl hydrazide which is activated to foam at low temperature.

The foams were formed into rombic blocks of 25×32×40 mm or into a stepped pyramid having a base of 45×45 and a height of 30 with retaining studs (as explained in the following) arranged at right angles to the base (32×40 to 45×45 respectively).

The melt indices referred are determined according to ASTM D1238 Conolition E, 190° C. 2.16 lead and measured in g/10 min.

EXAMPLE OF PROCESS OF INVENTION

With reference to the figure an inner pillar part 2 is secured by metal bolts or other fasterners 14 to an outer pillar part 4 in the course of assembly. A shield 6 is provided inside the pillar. Prior to assembly an insert of the composition of the invention 8 is secured by a stud 10 and optional washer 12 to the inner pillar part 2 so that, after assembly, the insert is clear of all surrounding walls.

In this manner the various components of the car-body paint system and particularly the phosphate treatment and electrophoresis treatment can take place and protect all exposed metal parts. It is to be noted also that on one side the spacing between the insert 8 and the facing walls of the inner pillar part 2 are adjacent. In this way upon heating, the expansion of the insert will cause contact with the metal wall and a good heat transfer into the insert from the exterior atmosphere surrounding the pillar may be obtained. In this way expansion of the insert to occupy the whole of the cross-sectional area is encouraged.

After the unfoamed insert has been secured, the assembled vehicle body is subjected to a phosphating treatment followed by rinsing and air drying at a 120° C. It is believed that the insert does not expand substantially in the drying stage. Next the vehicle body will be subjected to an electrophoresis treatment by dipping the vehicle bodies into an appropriate liquid medium and thereafter the vehicle bodies are cured at a temperature in excess of 180° C. In the course of this and further heat treatments following painting it is believed that the insert expands to occupy the whole cross section and form a plug. There may also be an element of expansion in a direction normal to the plain of the drawing. The continued curing does not heat the foamed insert to an extent where it will shrink unduly or where it detaches from the stud 10.

In modified versions of the invention, some physical blowing agent may be present to encourage early expansion of the insert. The formulation of the blowing agents and crosslinking agents may also be altered to take into account the differing heat treatment conditions which may prevail on different car body construction lines.

I claim:

1. A shaped, foamable part mounted in an open space of a vehicle body comprising a mixture of at least 65 wt.% of a base polymer containing units derived of ethylene and an olefinically unsaturated methyl acrylate having a melt index of from 0.1 to 6 and containing from 10 to 40 percent by weight of methyl acrylate, a crosslinking agent, a chemical blowing agent and a blowing agent activator so that the part is foamable to a closed cell foam and curable concurrently at a temperature between 110° and 190° C.

2. The part of claim 1 which is mounted in said open space so that the part is spaced from all surrounding internal metal walls.

3. The part according to clam 1 wherein aid mixture further contains a low density polyethylene polymer.

4. A part according to claim 1 in which the base polymer constitutes substantially the whole of the polymer present in the composition and has a MI of from 0.2 to 1 and contains from 12 to 18 wt % of methylacrylate.

5. A part according to claim 1 in which the base polymer has an overall softening point of above 90° C. and has a broad molecular weight distribution to provide melt strength.

6. A part according to claim 1 in which the crosslinking agent contains one or more components formulated to provide cross-linking upon heating above the overall softening point and upon exposure to elevated cure temperatures.

7. A part according to claim 6 wherein said crosslinking agent is selected from the group consisting of p-toluene sulfonyl hydrazide; 4,4-di tert butyl peroxy n-butyl valorate; 1,1-di tert butyl peroxy 3,3,5trimethylcyclohexane; bis (tert butyl peroxy isopropyl) benzene; and mixtures thereof.

8. A part according to claim 1 in which the chemical blowing agent is azodicarbonamide.

9. A part according to claim 1 in which the chemical blowing agent is p-toluene sulfonyl hydrazide.

* * * * *